(12) United States Patent
Jiang et al.

(10) Patent No.: US 12,046,917 B2
(45) Date of Patent: Jul. 23, 2024

(54) WIRELESS POWER TRANSFER UNIT, DEVICE, AND METHOD

(71) Applicant: HUAWEI TECHNOLOGIES CO., LTD., Guangdong (CN)

(72) Inventors: Weipeng Jiang, Beijing (CN); Tao Huang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/340,355

(22) Filed: Jun. 23, 2023

(65) Prior Publication Data

US 2023/0336030 A1  Oct. 19, 2023

Related U.S. Application Data

(63) Continuation of application No. PCT/CN2020/139665, filed on Dec. 25, 2020.

(51) Int. Cl.
*H02J 50/23* (2016.01)
*G01J 1/46* (2006.01)
*H02J 50/40* (2016.01)
*G01J 1/44* (2006.01)

(52) U.S. Cl.
CPC .............. *H02J 50/23* (2016.02); *G01J 1/46* (2013.01); *H02J 50/40* (2016.02); *G01J 2001/446* (2013.01)

(58) Field of Classification Search
CPC .............. H02J 50/23; H02J 50/40; G01J 1/46
See application file for complete search history.

(56) References Cited

U.S. PATENT DOCUMENTS

2020/0127494 A1\* 4/2020 Stevens .................. H02J 50/90

\* cited by examiner

*Primary Examiner* — Thanh Luu
(74) *Attorney, Agent, or Firm* — WOMBLE BOND DICKINSON (US) LLP

(57) ABSTRACT

This application provides a wireless power transfer unit, device, and method. The wireless power transfer unit includes a radiation source, a light-emitting body, a controller, and a metasurface. The radiation source is configured to emit an electromagnetic wave signal. The controller is configured to control the light-emitting body to provide light sources of different light intensities. The light-emitting body provides the light sources of different light intensities in response to control of the controller. The metasurface is configured to perform phase adjustment on the electromagnetic wave signal that is incident to the metasurface. Equivalent impedance of the metasurface varies with a change of the light intensity, so that an offset of a phase of the electromagnetic wave signal emitted through the metasurface also varies with the change of the light intensity.

20 Claims, 10 Drawing Sheets a)

b)

WIRELESS POWER TRANSFER UNIT, DEVICE, AND METHOD

CROSS-REFERENCE TO RELATED APPLICATIONS

This application is a continuation of International Application No. PCT/CN2020/139665, filed on Dec. 25, 2020, the disclosure of which is hereby incorporated by reference in its entirety.

TECHNICAL FIELD

This application relates to the field of wireless power transfer, and more specifically, to a wireless power transfer unit, device, and method.

BACKGROUND

A wireless charging technology is an important technology for implementing long-distance wireless charging. Microwave wireless charging is a main manner of the wireless charging technology. During microwave wireless charging, an electromagnetic wave may be emitted through a radiation source in a power transfer device, and energy is focused at a remote position, to wirelessly charge a power receiving device at this position.

However, precision of phase control by using current microwave wireless charging technologies is low. This directly affects precision of energy focusing, and consequently, affects charging efficiency.

SUMMARY

This application provides a wireless power transfer unit, device, and method, to improve precision of phase control in a wireless charging technology. This can improve precision of energy focusing and charging efficiency.

This application discloses some embodiments of a wireless power transfer unit, including a radiation source, a light-emitting body, a controller, and a metasurface. The radiation source is configured to emit an electromagnetic wave signal. The controller is configured to control the light-emitting body to provide light sources of different light intensities. The light-emitting body provides the light sources of different light intensities in response to control of the controller. The metasurface is configured to perform phase adjustment on the electromagnetic wave signal that is incident to the metasurface, so that a phase of the electromagnetic wave signal emitted through the metasurface shifts relative to a phase before the electromagnetic wave signal is incident. Equivalent impedance of the metasurface varies with a change of the light intensity of the light source, so that an offset of the phase of the electromagnetic wave signal emitted through the metasurface also varies with the change of the light intensity of the light source.

Based on the foregoing technical content, the light-emitting body provides the light sources of different light intensities, so that surface impedance of the metasurface varies with the change of the light intensity, to change the offset of the phase of the electromagnetic wave signal. In this way, a same wireless power transfer unit can provide a plurality of different offsets of phases, that is, multi-bit precision phase control is implemented. Because the plurality of different offsets of phases may be provided, the electromagnetic wave signal emitted by the wireless power transfer unit can focus energy with higher precision. This helps improve charging efficiency.

In addition, the wireless power transfer unit may use a microstrip patch antenna as a radiation source, so that an overall design of the wireless power transfer unit is compact and approximates to a plane. Therefore, a plurality of wireless power transfer units may be integrated into a same wireless power transfer device, and the one or more plurality of wireless power transfer units may face different directions, to emit electromagnetic waves in a plurality of different directions. This can focus energy in different directions and facilitate omnidirectional coverage.

In some embodiments, the metasurface includes at least one photosensitive device and a metal sheet connected to two electrodes of each photosensitive device. When the electromagnetic wave signal is incident to the metasurface, each photosensitive device and the metal sheet connected to the photosensitive device form an equivalent resonant circuit. Capacitance of the photosensitive device varies with the change of the light intensity, so that the equivalent impedance of the metasurface also varies with the change of the light intensity.

According to an equivalent circuit principle, the phase of the transmitted electromagnetic wave may be changed by changing equivalent impedance of the transmission metasurface structure. For example, different transmission or reflection phases are selected for some metasurfaces by designing shape parameters of the metal sheet in the surface structure. In this embodiment of this application, the photosensitive device is introduced into the metasurface, so that the metasurface can respond to different light intensities. The equivalent impedance of the metasurface may vary with the change of the light intensity of the light source provided by the light-emitting body. The change of the equivalent impedance can enable the offset of the phase of the electromagnetic wave signal emitted through the metasurface vary accordingly. In brief, the phase of the emitted electromagnetic wave signal may be changed by changing the light intensity of the light source, that is, the phase of the electromagnetic wave signal may be adjusted.

By introducing the photosensitive device, the metasurface may be enabled to respond to different light intensities to implement control on the offset of the phase of the electromagnetic wave signal. Because a structure of the photosensitive device is simple, no complex control circuit needs to be introduced, and impact on a transmission rate of the metasurface caused by introduction of a complex control circuit may also be avoided.

In some embodiments, the photosensitive device is a photosensitive capacitor.

In some embodiments, the photosensitive device includes a photodiode and a varactor. A positive electrode of the photodiode is connected to a negative electrode of the varactor, and a negative electrode of the photodiode is connected to a positive electrode of the varactor, to apply a voltage to the varactor. The voltage applied by the photodiode to the varactor varies with the change of the light intensity, so that capacitance of the varactor also varies with the change of the light intensity.

It should be understood that the photodiode and the varactor may be directly connected, or may be connected by using another component. This is not limited in this embodiment of this application.

It should be further understood that the photosensitive device may be considered as a generic term for devices whose capacitance varies with a change of a light intensity.

The photosensitive device may include but is not limited to the foregoing two designs. Based on a same idea, a person skilled in the art may design another photosensitive device that can enable capacitance to change in response to a change of a light intensity, so that the equivalent impedance of the metasurface varies with the change of the light intensity.

In brief, any design in which the equivalent impedance of the metasurface can vary with the change of the light intensity shall fall within the protection scope of this application.

In some embodiments, the light-emitting body includes at least one light-emitting unit. The controller includes at least one control unit. Each of the at least one control unit corresponds to one or more of the at least one light-emitting unit. Each control unit is configured to control the corresponding light-emitting unit to emit light or be extinguished, to control a light-emitting region and/or a light intensity of the light-emitting body.

It should be understood that various combinations of light-emitting or extinguished states of the plurality of light-emitting units may finally generate light sources of a plurality of light intensities, so that the equivalent impedance of the metasurface may vary with the change of the light intensity of the light source provided by the light-emitting body. The change of the equivalent impedance enables the offset of the phase of the electromagnetic wave signal emitted through the metasurface vary accordingly.

In addition, because the different light-emitting units are controlled to emit light or be extinguished, the plurality of light-emitting units as a whole may seem to be capable of providing light sources in different regions, to achieve effect of controlling the light-emitting region. By controlling the different light-emitting regions to provide the light sources, the equivalent impedance of the metasurface may also vary with a change of the light-emitting region, so that the offset of the phase of the electromagnetic wave signal emitted through the metasurface vary accordingly.

Certainly, a combination of changing the light intensity and changing the light-emitting region may also achieve effect of changing the equivalent impedance of the metasurface, to change the offset of the phase of the electromagnetic wave signal emitted through the metasurface.

In some embodiments, each of the at least one light-emitting unit corresponds to one or more of at least one optoelectronic unit. Each optoelectronic unit includes one photosensitive device and a metal sheet connected to two electrodes of the photosensitive device.

It should be understood that the photosensitive device and the metal sheet connected to the two electrodes of the photosensitive device are designed, so that the optoelectronic unit can form an equivalent resonant circuit. In the equivalent resonant circuit, capacitance of the photosensitive device varies with the change of the light intensity, so that the equivalent impedance of the metasurface also varies with the change of the light intensity.

In some embodiments, the radiation source includes at least one radiating element. Each of the at least one light-emitting unit corresponds to one or more of the at least one radiating element. Each light-emitting unit and the corresponding optoelectronic unit are configured to control an offset of a phase that is generated when an electromagnetic wave signal emitted by the corresponding one or more radiating elements passes through the metasurface.

It should be understood that a change of a light intensity brought by light emitting and extinguishing of each light-emitting unit may affect an offset of a phase of an electromagnetic wave signal emitted by one or more antenna units corresponding to each light-emitting unit, so that the offset of the phase varies with the change of the light intensity. For example, each light-emitting unit may be surrounded by four antenna units, and is configured to affect offsets of phases of electromagnetic wave signals emitted by the four antenna units.

In some embodiments, the at least one light-emitting unit is in a one-to-one correspondence with the at least one radiating element.

In other words, each light-emitting unit corresponds to a radiating element, and a quantity of light-emitting units is the same as a quantity of radiating elements. The light-emitting units and the radiating elements may be arranged in a mutually staggered manner, to form an array of light-emitting units and an array of radiating elements.

In some embodiments, the radiating element is a microstrip antenna unit. The microstrip antenna unit includes one or more microstrip patch antennas.

It should be understood that using the microstrip antenna unit as the radiating element can greatly reduce a volume of the wireless power transfer unit, to facilitate integration of the wireless power transfer unit.

In some embodiments, the wireless power transfer unit further includes a grid layer. The grid layer includes a plurality of grids. Each of the plurality of light-emitting units and the corresponding one or more optoelectronic units and one or more radiating elements are located in one grid of the grid layer.

The grids are disposed between the light-emitting units, to prevent a light source provided by a light-emitting unit in a grid from interfering with a light source provided by an optoelectronic unit in another grid.

In some embodiments, the electromagnetic wave signal is a microwave signal. The grid layer is mainly made of a microwave transparent dielectric material. Therefore, a loss of a microwave signal can be reduced while a light source is isolated.

In some embodiments, the at least one light-emitting unit and the at least one radiating element are located on a first surface of a dielectric layer, and the first surface is opposite to an incident surface of the metasurface.

It should be understood that the at least one light-emitting unit and the at least one radiating element are located on the first surface of the dielectric layer, and the first surface is opposite to the incident surface of the metasurface, so that the light-emitting unit can regulate the equivalent impedance of the metasurface, and the radiating element can provide the electromagnetic wave signal for the metasurface. In addition, the light-emitting unit and the radiating element are located on the surface, greatly reducing the volume of the wireless power transfer unit.

The light-emitting unit and the radiating element are integrated on the first surface of the dielectric layer, so that the volume of the wireless power transfer unit can be reduced. This facilitates integration of the one or more plurality of wireless power transfer units into the same wireless power transfer device, and makes omnidirectional coverage possible.

In some embodiments, the controller is located on a second surface of the dielectric layer, and the second surface is away from the incident surface of the metasurface.

The controller is disposed on the second surface of the dielectric layer, so that the volume of the wireless power transfer unit can be reduced, and the light source provided by the light-emitting unit and the electromagnetic wave signal emitted by the radiating element are not blocked.

It should be understood that a position of the controller is not limited in this application, provided that light emitting or extinguishing of the light-emitting body can be controlled.

In some embodiments, the wireless power transfer unit further includes a feeder end that feeds the radiation source. The feeder end is located on the second surface of the dielectric layer. The second surface is away from the incident surface of the metasurface.

The controller is integrated on the second surface of the dielectric layer, so that the volume of the wireless power transfer unit can be further reduced. This facilitates integration of the one or more plurality of wireless power transfer units into the same wireless power transfer device.

The feeder end is disposed on the second surface of the dielectric layer, so that the volume of the wireless power transfer unit can be reduced, and the light source provided by the light-emitting unit and the electromagnetic wave signal emitted by the radiating element are not blocked.

It should be understood that a position of the feeder end is not limited in this application, provided that feeding can be provided for the radiation source.

In some embodiments, the feeder end of the at least one radiating element performs coaxial feeding.

In some embodiments, the electromagnetic wave signal is a microwave signal.

This application discloses some embodiments of a wireless power transfer device, including a microwave power source and one or more wireless power transfer units. The microwave power source is configured to provide a microwave signal to the one or more wireless power transfer units.

It should be understood that the wireless power transfer unit may be the wireless power transfer unit in any one of the embodiments discussed herein. In some embodiments, the wireless power transfer device includes a plurality of wireless power transfer units. The wireless power transfer device further includes a power splitter, configured to perform power distribution on the microwave signal, to output a plurality of microwave signals to the one or more plurality of wireless power transfer units.

In some embodiments, emergent surfaces of the one or more plurality of wireless power transfer units face at least two different directions, to emit microwave signals in the at least two different directions.

It should be understood that an appearance of the wireless power transfer device may be a three-dimensional structure having a plurality of surfaces, such as a triangular prism, a hexahedron, a triangular pyramid, a quadrangular prism, a quadrangular pyramid, a hexagonal prism, and a hexagonal pyramid. When the wireless power transfer units are deployed on at least two surfaces of these three-dimensional structures, the wireless power transfer device may emit microwave signals in different directions by using the wireless power transfer units deployed on different surfaces. This facilitates omnidirectional coverage, that is, charging power receiving devices in the different directions.

This application discloses some embodiments of a wireless power transfer method, including: receiving an energy feedback from a power receiving device, where the energy feedback includes at least one energy intensity fed back by the power receiving device for at least one light intensity, and each energy intensity is determined by the power receiving device based on received energy; determining a light intensity corresponding to a maximum value of the at least one energy intensity as a target light intensity used for charging the power receiving device; and controlling the light intensity of the light-emitting body to be within the target light intensity, where the target light intensity acts on the metasurface, to perform phase adjustment on the electromagnetic wave emitted by the radiation source.

It should be understood that the wireless power transfer method provided in some embodiments may be applied to the wireless power transfer unit, or may be applied to the wireless power transfer device. The wireless power transfer unit may include a radiation source, a light-emitting body, a controller, and a metasurface. The radiation source is configured to emit an electromagnetic wave signal. The controller is configured to control a light intensity of the light-emitting body. The light-emitting body provides light sources of different light intensities in response to control of the controller. Equivalent impedance of the metasurface varies with a change of the light intensity of the light source, so that an offset of a phase of the electromagnetic wave signal emitted through the metasurface also varies with the change of the light intensity of the light source.

In some embodiments, the method further includes: determining a light-emitting region corresponding to the maximum value of the at least one energy intensity as a target light-emitting region; and controlling the light-emitting body to provide a light source in the target light-emitting region.

It should be understood that the light-emitting body includes at least one light-emitting unit. The controller includes at least one control unit. Each of the at least one control unit corresponds to one or more of the at least one light-emitting unit. Each control unit is configured to control the corresponding light-emitting unit to emit light or be extinguished, to control a light-emitting region and/or the light intensity of the light-emitting body. The energy feedback is at least one energy intensity fed back for a different combination of the at least one light intensity and at least one light-emitting region.

In some embodiments, the method further includes: The controller controls the at least one light-emitting unit to provide a light source in a plurality of combinations, to provide light sources of different light intensities in different light-emitting regions. The plurality of combinations are obtained by traversing a light-emitting state and an extinguished state of each of the at least one light-emitting unit.

In some embodiments, a wireless power transfer device is provided. The device includes the wireless power transfer unit and a unit configured to implement the method in any one of the embodiments discussed herein. It should be understood that each unit configured to implement the method in any one of the embodiments discussed herein may implement a corresponding function by executing a computer program.

In some embodiments, a wireless power transfer device is provided. The device includes the wireless power transfer unit, the memory, and the processor in any one of the embodiments discussed herein. The memory may be configured to store a computer program. The processor may be configured to invoke the computer program in the memory, so that the computing device performs the method in any one of the embodiments discussed herein. In some embodiments, the computing device further includes a communications interface. The communications interface is coupled to the processor. The communications interface is configured to input and/or output information. For example, the information includes a target light intensity used for charging the power receiving device.

In some embodiments, there are one or more processors, and there are one or more memories.

In some embodiments, the memory may be integrated with the processor, or the memory and the processor are separately disposed.

In some embodiments, a computer program product is provided. The computer program product includes a computer program (which may also be referred to as code or instructions). When the computer program is run, a computer is enabled to perform the method in any one of the embodiments discussed herein.

In some embodiments, a computer-readable storage medium is provided. The computer-readable storage medium stores a computer program (which may also be referred to as code or instructions). When the computer program is run, a computer is enabled to perform the method in any one of the embodiments discussed herein.

DESCRIPTION OF EMBODIMENTS

Figure 1:
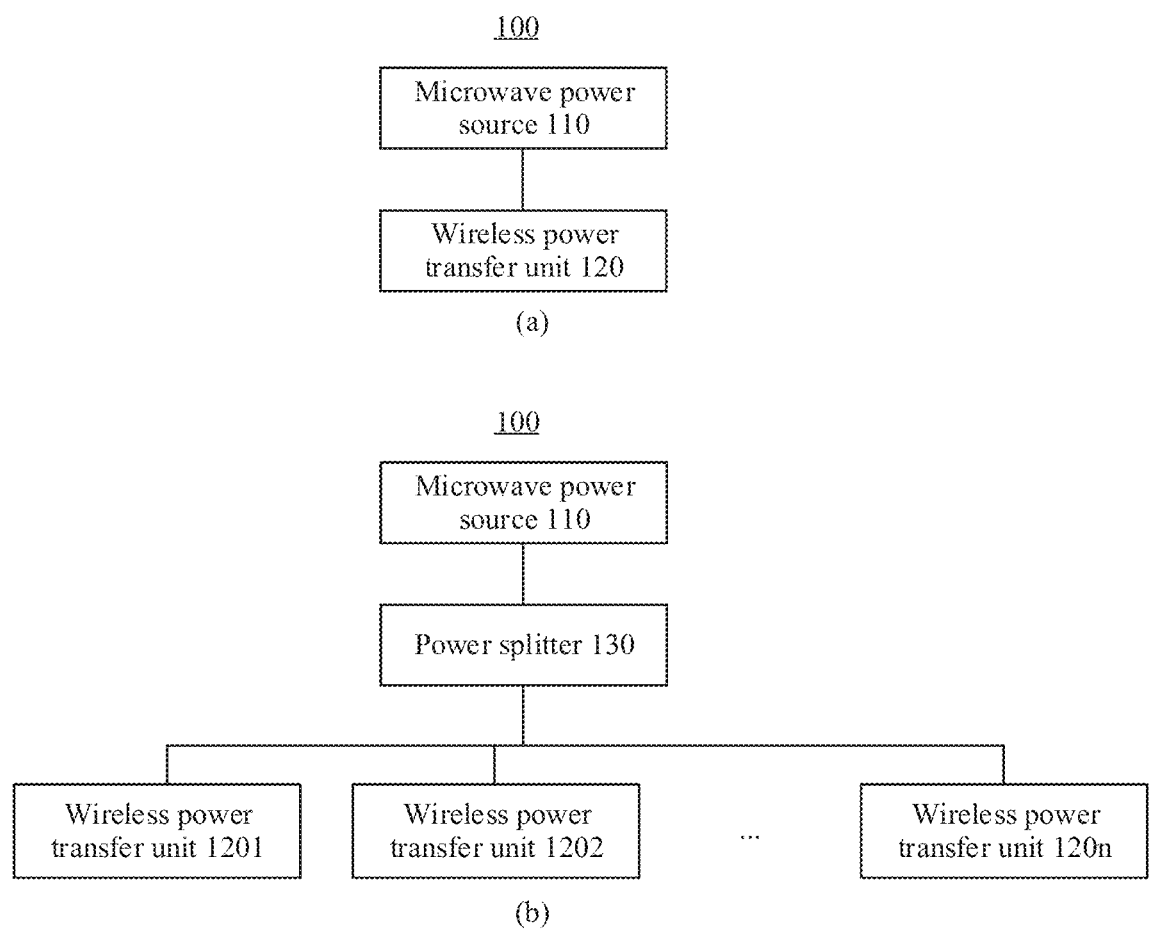
FIG. 1 is a schematic diagram of a structure of a wireless power transfer device according to an embodiment of this application.

The following describes technical solutions of this application with reference to accompanying drawings.

An apparatus provided in this application may be applied to a plurality of fields. For example, the apparatus is applied to the industrial field to implement unattended automatic charging; applied to household appliances, such as a wireless power-supplying cuisine machine, a wireless power-supplying rice cooker, and a wireless robotic vacuum cleaner; applied to low-power wireless charging products, such as a mobile phone, a mouse, a keyboard, an electric toothbrush, an electric shaver, a palmtop computer, and an intelligent wearable device; applied to micro-power products, such as an implantable medical product, a wireless sensor network product, and other receive-end miniaturization products; applied to mobile devices, such as a robot, an unmanned aerial vehicle, a vehicle, a space station, and a satellite; applied to non-contact charging of underwater devices, such as an underwater robot, an underwater weapon, and an unmanned submersible watercraft; and applied to non-contact charging of special working conditions, such as an oil well, slurry, an explosion-proof environment, a non-contact explosion condition, and a small device on a large rotating device.

To facilitate understanding of embodiments of this application, the following descriptions are first provided.

First, for ease of understanding, the following describes in detail a wireless power transfer unit and a wireless power transfer device provided in this application with reference to a plurality of accompanying drawings. However, the accompanying drawings are merely examples for ease of understanding. Relative distances between parts, and shapes and sizes of the parts shown in the drawings are not necessarily the same as those of the real object or scaled proportionally.

Second, position relationships shown in the following accompanying drawings are merely for ease of understanding, and shall not constitute any limitation on this application. For example, positions of a radiation source and a light-emitting body are not limited to the case shown in the accompanying drawings, and the positions may be randomly changed when embodiments of this application are implemented.

Third, sizes and shapes of apparatuses in the following accompanying drawings are merely for ease of distinguishing, and are not actual sizes and shapes of objects. In addition, a quantity of apparatuses in the following accompanying drawings except a limited quantity is an example. For example, for radiation sources and light-emitting bodies, quantities of the radiation sources and the light-emitting bodies vary with actual requirements, and a quantity relationship between the radiation sources and the light-emitting bodies may also be inconsistent. A quantity in the accompanying drawings is not limited in this application.

Fourth, in embodiments of this application, "at least one" may represent one or more. "A plurality of" means two or more than two.

In addition, to facilitate understanding of embodiments of this application, terms used in this application are briefly described.

1. A metasurface is an artificial layered material with a thickness less than a wavelength. It may be a two-dimensional plane structure formed by artificial atoms with special electromagnetic attributes according to a specific arrangement manner. The metasurface can flexibly and effectively adjust characteristics such as polarization, an amplitude, a phase, a polarization manner, and a propagation mode. The metasurface may be regarded as a two-dimensional correspondence of a metamaterial.

2. A photodiode is a semiconductor device made from a PN junction, has unidirectional conductivity, and is a photoelectric sensor that converts an optical signal into an electrical signal in a circuit. The photodiode works under a reverse voltage. When there is no light, a reverse current is very weak, and is also called a dark current. When there is light, the reverse current rapidly increases and becomes a photocurrent. Greater light intensity indicates a greater reverse current.

3. A varactor, also known as a "variable reactance diode", is formed based on a feature that junction capacitance changes with an applied voltage when a PN junction is reversed. When a reverse bias voltage increases, the junction capacitance decreases. When the reverse bias voltage decreases, the junction capacitance increases. It is mainly used for automatic tuning, frequency modulation, phase modulation, and the like in a high-frequency circuit.

4. A photosensitive capacitor, also known as an "optical variable capacitor" or "optical controlled capacitor", can change capacitance with a light intensity.

5. A microstrip antenna includes a dielectric layer, a radiator, and a ground plate. A thickness of the dielectric layer is far less than a wavelength. The radiator may be a thin metal layer located on an upper surface of the dielectric layer, for example, may be obtained through a photoetching process. A shape parameter of a radiating patch may be designed based on a requirement. The ground plate may be a thin metal layer located on a lower surface of the dielectric layer. Compared with a conventional antenna, the microstrip antenna is not only small-sized, light-weighted, low-profile, and easy to conform, but also easy to integrate, low-cost, and suitable for mass production. In addition, the microstrip antenna has advantages such as diversified backup power performance.

6. A microstrip patch antenna is a type of microstrip antenna, and also has a structure of the microstrip antenna. A radiator of the microstrip patch antenna may be a conductive patch that is located on an upper surface of a dielectric layer and has a specific shape of plane geometry.

7. A phase is a position of a wave, for example, the electromagnetic wave described in this embodiment of this application, in a cycle of the wave at a specific moment. The phase is a metric that describes a change of a signal waveform, and usually may be in a unit of an angle (or a degree for short), and is also referred to as a phase angle. When the signal waveform changes periodically, a waveform cycle is 360°.

The following describes in detail the wireless power transfer unit, device, and method provided in embodiments of this application with reference to the accompanying drawings.

For ease of understanding, a structure of a wireless power transfer device is first briefly described with reference to a) and b) in FIG. 1. The wireless power transfer device shown in FIG. 1 may be, for example, a microwave wireless power transfer device, for example, a microwave wireless power transmitter. The microwave wireless power transfer device may provide a microwave signal and adjust a phase of the microwave signal, to focus energy at one or more positions and charge a power receiving device. It should be understood that the wireless power transfer device provided in this embodiment of this application may alternatively focus energy by using another type of electromagnetic wave signal. This is not limited in this embodiment of this application.

It should be understood that the microwave wireless power transfer device may provide a microwave signal in a frequency band from 300 kilohertz (KHz) to 300 gigahertz (GHz). This is a possible form of the wireless power transfer device. However, this shall not constitute any limitation on this application. This application does not exclude that another electromagnetic wave signal is used to implement wireless charging in the conventional technology or the future technology.

For ease of description, the following describes a wireless power transfer unit, a wireless power transfer device, and a wireless power transfer method provided in embodiments of this application by using an example in which a microwave signal is used as an electromagnetic wave signal.

a) in FIG. 1 shows a wireless power transfer device including one wireless power transfer unit. As shown in the figure, the wireless power transfer device 100 may include a microwave power source 110 and a wireless power transfer unit 120. The microwave power source 110 may be configured to generate a high-power microwave signal, for example, may be a 5.8 GHz microwave signal with 20 watts power, and is configured to provide a microwave signal to the wireless power transfer unit 120. The wireless power transfer unit 120 may include a radiation source, and the radiation source may be two-dimensional, so that the entire wireless power transfer unit 120 is approximately a radiation surface when viewed as a whole. By way of example, and not limitation, the radiation source may include one or more microstrip antennas. A radiator that is in the microstrip antenna and that is configured to emit a microwave signal may be integrated on an upper surface of a dielectric layer through a photoetching process or in a manner of laminating. It may be understood that when the radiator is integrated on the upper surface of the dielectric layer in a manner of laminating, the microstrip antenna may be referred to as a microstrip patch antenna.

It should be noted that, because one or more antennas (for example, the foregoing microstrip antenna) are integrated into the wireless power transfer unit and emit a microwave signal to the outside, the one or more antennas are similar to an emitting source of a microwave signal as a whole. Therefore, in this embodiment of this application, one or more antennas included in the wireless power transfer unit 120 are referred to as radiation sources. For brevity, descriptions of a same or similar case are omitted below.

It should be understood that the wireless power transfer unit 120 may emit a microwave signal to the outside by using a structure shown in FIG. 3 to FIG. 11 in the following, and adjust an electromagnetic field, to focus energy at an expected position (for example, a position of the power receiving device) and charge the power receiving device. The following describes in detail a structure and a function of the wireless power transfer unit 120 with reference to FIG. 3 to FIG. 11, and details are not described herein.

b) in FIG. 1 shows a wireless power transfer device including a plurality of wireless power transfer units. As shown in the figure, in addition to the microwave power source 110, the wireless power transfer device 100 may further include a wireless power transfer unit 1201, a wireless power transfer unit 1202 to a wireless power transfer unit 120n, and a power splitter 130, and n is a natural number greater than 1.

A function of the microwave power source 110 is described above, and details are not described herein again. The power splitter 130 is short for a power divider, and is a device that divides energy of one input signal into two or more paths and outputs equal or unequal energy. In the wireless power transfer device 100, the power splitter 130 may be configured to perform power allocation for a high-power microwave signal sent by the microwave power source 110, to output n microwave signals to the n wireless power transfer units 1201 to 120n.

It should be noted that emergent surfaces of the wireless power transfer units 1201 to 120n in this embodiment of this application may face at least two different directions, to emit microwave signals in the at least two different directions.

Figure 2:
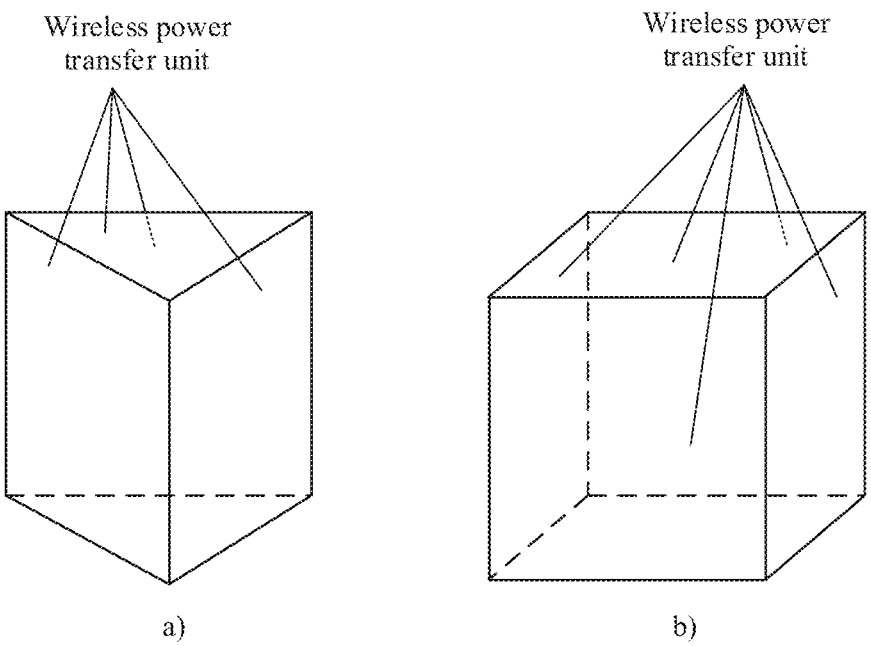
FIG. 2 is a schematic diagram of an appearance of a wireless power transfer device including a plurality of wireless power transfer units according to an embodiment of this application.

FIG. 2 shows a schematic diagram of an appearance of a wireless power transfer device including a plurality of wireless power transfer units.

The appearance of the wireless power transfer device shown in a) in FIG. 2 is a triangular prism, and a wireless power transfer unit may be deployed on any one or more of three side surfaces and an upper surface of the triangular prism. When wireless power transfer units are deployed on at least two surfaces of the triangular prism, the wireless power transfer device may emit microwave signals in different directions by using the wireless power transfer units deployed on different surfaces, to charge power receiving devices in different directions.

The appearance of the wireless power transfer device shown in b) in FIG. 2 is a hexahedron, and a wireless power transfer unit may be deployed on any one or more of four side surfaces and an upper surface of the hexahedron. When wireless power transfer units are deployed on at least two surfaces of the hexahedron, the wireless power transfer device may emit microwave signals in different directions by using the wireless power transfer units deployed on different surfaces, to charge power receiving devices in different directions.

It should be understood that the appearance of the wireless power transfer device shown in FIG. 2 is merely two possible forms, and should not constitute any limitation on this application. For example, the appearance of the wireless power transfer device may alternatively be a three-dimensional structure having a plurality of surfaces, such as a triangular prism, a quadrangular prism, a quadrangular pyramid, a hexagonal prism, and a hexagonal pyramid. This is not limited in embodiments of this application.

Figure 3:
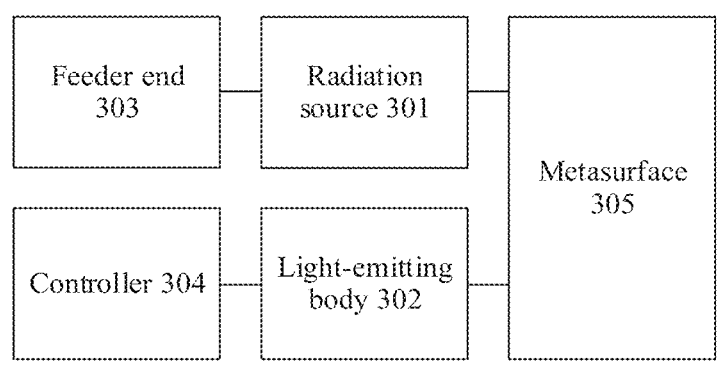
FIG. 3 is a schematic diagram of a wireless power transfer unit according to an embodiment of this application.

FIG. 3 is a schematic diagram of a structure of a wireless power transfer unit 300 according to an embodiment of this application. As shown in FIG. 3, the wireless power transfer unit 300 may include a radiation source 301, a light-emitting body 302, a feeder end 303 configured to feed the radiation source 301, a controller 304 configured to control the light-emitting body 302, and a metasurface 305.

The feeder end 303 may feed the radiation source 301, so that the radiation source 301 emits a microwave signal. In some embodiments, the feeder end 303 may perform coaxial feeding.

The controller 304 may be configured to control the light-emitting body 302 to provide light sources of different light intensities. The light-emitting body 302 may provide light sources of different light intensities in response to control of the controller 304.

In some embodiments, the light-emitting body 302 may include at least one light-emitting unit, and the controller 304 may include at least one control unit. Each of the at least one control unit corresponds to one or more of the at least one light-emitting unit, and each control unit is configured to control the corresponding light-emitting unit to emit light or be extinguished, to control a light-emitting region and/or a light intensity of the light-emitting body 302.

For example, each control unit may be configured to control one light-emitting unit to emit light or be extinguished. When there are a plurality of light-emitting units, and one array is formed, light intensities in different degrees may be achieved through control of each control unit. For example, when all light-emitting units are controlled to emit light, the light intensity is the strongest; when all light-emitting units are controlled to be extinguished, no light source is provided, that is, the light intensity is the weakest; when a part of light-emitting units are controlled to emit light and the other light-emitting units are controlled to be extinguished, the light intensity is between the strongest and the weakest, and the light intensity may gradually increase as a quantity of extinguished light-emitting units decreases. Therefore, on a whole, the controller 304 may be configured to control the light intensity of the light-emitting body 302.

For example, two light-emitting units (a light-emitting unit A and a light-emitting unit B) are used as an example. There are four corresponding combinations of light-emitting or extinguished states: A is extinguished, and B is extinguished; A emits light, and B is extinguished; A is extinguished, and B emits light; and A emits light, and B emits light. When a light intensity of the light-emitting unit A is different from that of the light-emitting unit B, the corresponding light-emitting body may have four different light intensities. In addition, it may be understood that light intensities provided by a combination of A emitting light and B being extinguished and a combination of A being extinguished and B emitting light may be similar, but light-emitting regions may also be slightly different.

For another example, each control unit may be configured to control a plurality of light-emitting units to emit light or be extinguished. The plurality of light-emitting units may be light-emitting units concentrated in a region. When a plurality of light-emitting units controlled by a control unit emit light, a region corresponding to the plurality of light-emitting units may provide a light source. When a plurality of light-emitting units controlled by a control unit is extinguished, a region corresponding to the plurality of light-emitting units cannot provide a light source. Therefore, on a whole, the controller 304 may be configured to control the light-emitting region of the light-emitting body 302.

For another example, a plurality of control units may be configured to control a plurality of light-emitting units to emit light or be extinguished. Light-emitting units controlled by every two or more control units may be concentrated in a same region and staggeringly arranged. It is assumed that light-emitting units controlled by two control units are concentrated in a same region and staggeringly arranged. When a plurality of light-emitting units controlled by the two control units all emit light, a light intensity in this region may be maximum. When a plurality of light-emitting units controlled by one control unit emit light, and a plurality of light-emitting units controlled by the other control unit are extinguished, the light intensity in this region is weakened. When all the plurality of light-emitting units controlled by the two control units are extinguished, this region cannot provide the light intensity. Therefore, on a whole, the controller 304 may be configured to control the light-emitting region and the light intensity of the light-emitting body 302.

By way of example, and not limitation, the light-emitting unit is a light-emitting diode (LED), an organic light-emitting diode (organic LED, OLED), or the like. An LED is used as an example, each light-emitting unit may include one or more LEDs. This is not limited in embodiments of this application.

In some embodiments, the radiation source 301 may include at least one radiating element.

By way of example, and not limitation, the radiating element is a microstrip antenna unit. Each microstrip antenna unit may include one or more microstrip patch antennas.

In some embodiments, each of the at least one light-emitting unit corresponds to one or more of the at least one radiating element.

In other words, a change of a light intensity brought by light emitting and extinguishing of each light-emitting unit may affect an offset of a phase of a microwave signal emitted by one or more radiating elements corresponding to each light-emitting unit, so that the offset of the phase varies with the change of the light intensity. For example, each light-emitting unit may be surrounded by four radiating elements, and is configured to affect offsets of phases of microwave signals emitted by the four radiating elements.

In some embodiments, the at least one light-emitting unit is in a one-to-one correspondence with the at least one radiating element. In other words, each light-emitting unit corresponds to a radiating element, and a quantity of light-emitting units is the same as a quantity of radiating elements.

Furthermore, the light-emitting units and the radiating elements may be arranged in a mutually staggered manner, to form an array of light-emitting units and an array of radiating elements.

Figure 4:
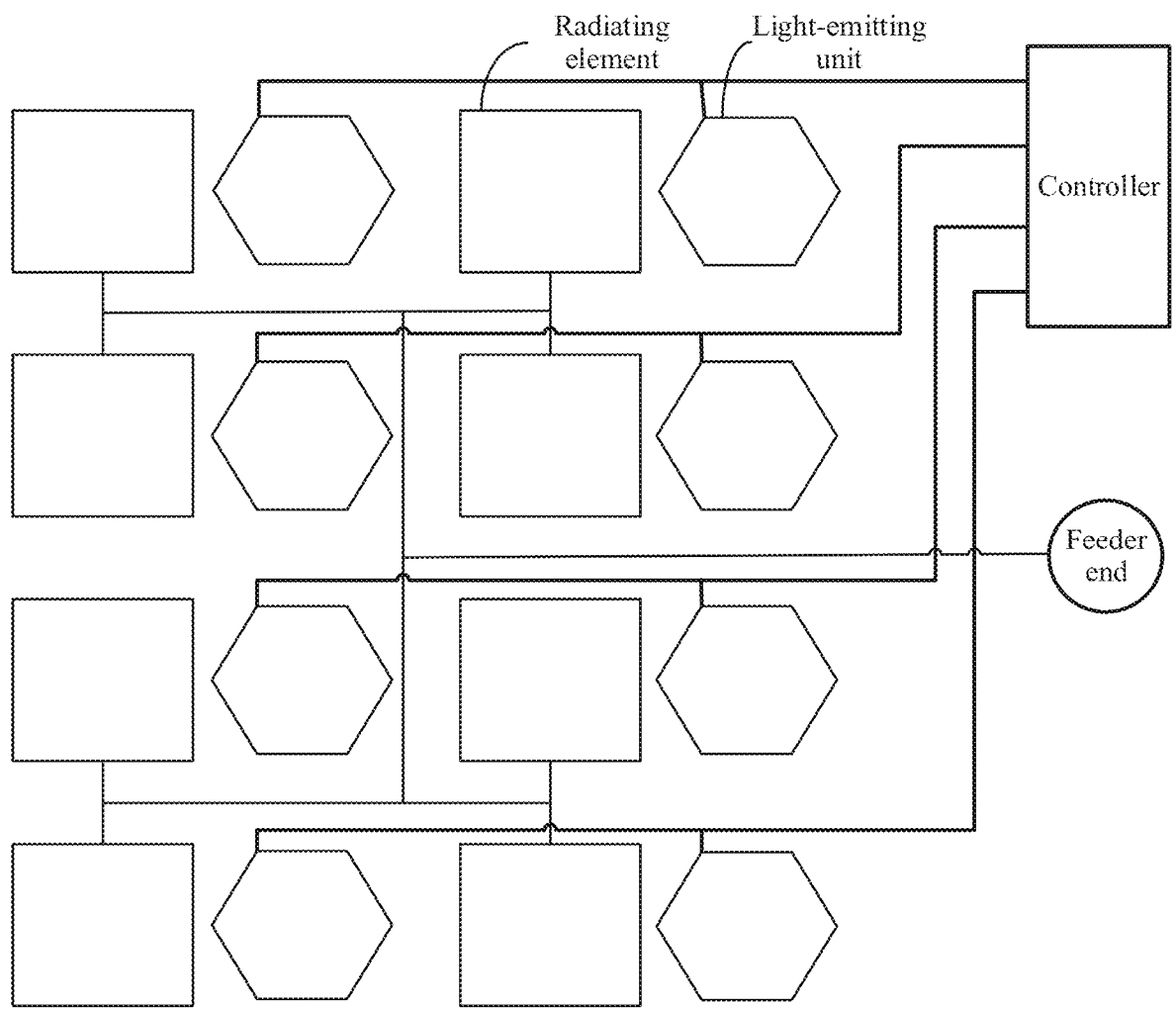
FIG. 4 is a schematic diagram of a light-emitting unit and a radiating element according to an embodiment of this application.

FIG. 4 shows an example in which light-emitting units are in a one-to-one correspondence with radiating elements. As shown in FIG. 4, for example, a square is used to represent a radiating element, and a regular hexagon is used to represent a light-emitting unit. It should be understood that FIG. 4 is merely for ease of differentiation, and different patterns are used to represent different units, and should not constitute any limitation on real forms of the radiating element and the light-emitting unit.

It should be further understood that FIG. 4 is merely for ease of understanding, and shows an example of a possible layout form of a radiation source and a feeder end of the radiation source, a light-emitting body, and a controller of the light-emitting body, but should not constitute a limitation on this embodiment of this application.

In this embodiment of this application, a metasurface 305 may be configured to perform phase adjustment on a microwave signal that is incident to the metasurface 305, so that a phase of the microwave signal emitted through the metasurface 305 shifts relative to a phase before the microwave signal is incident.

Specifically, equivalent impedance of the metasurface 305 can vary with a change of the light intensity of the light source provided by the light-emitting body, and the change of the equivalent impedance can enable the offset of the phase of the microwave signal emitted through the metasurface vary accordingly. In brief, the phase of the emitted microwave signal may be changed by changing the light intensity of the light source, that is, the phase of the microwave signal may be adjusted.

Figure 5:
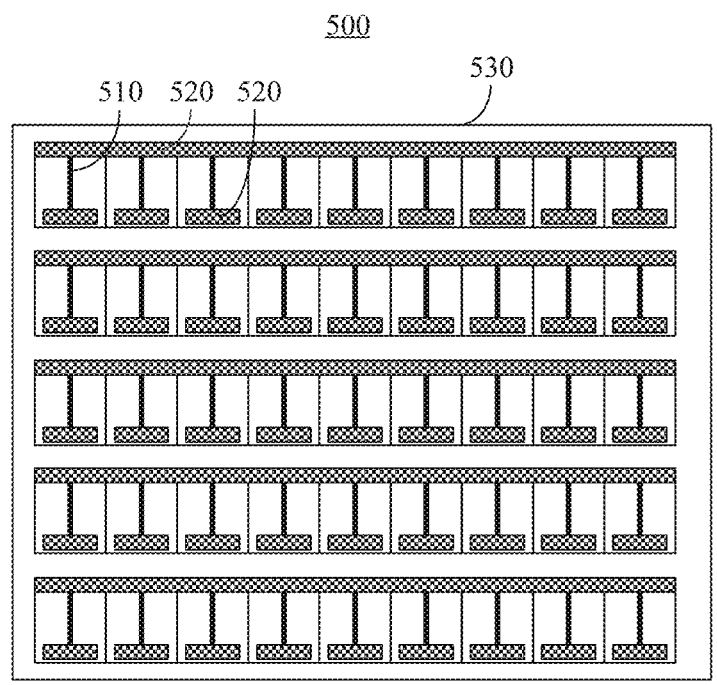
FIG. 5 is a schematic diagram of a metasurface and an equivalent resonant circuit formed by an optoelectronic unit according to an embodiment of this application.
Figure 5:
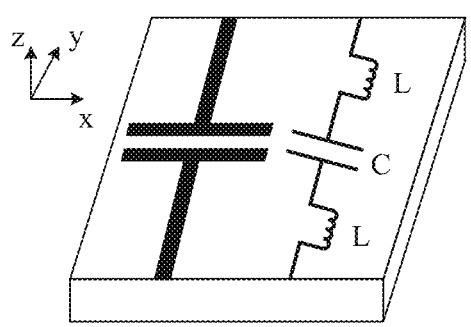
Figure 6:
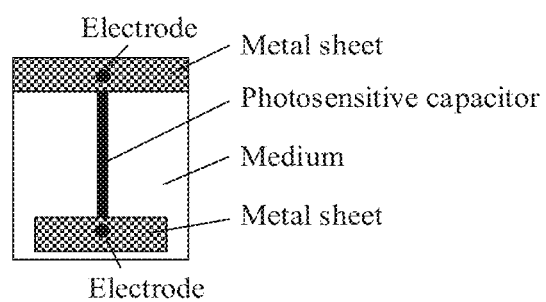
FIG. 6 and FIG. 7 are schematic diagrams of structures of an optoelectronic unit according to an embodiment of this application.
Figure 7:
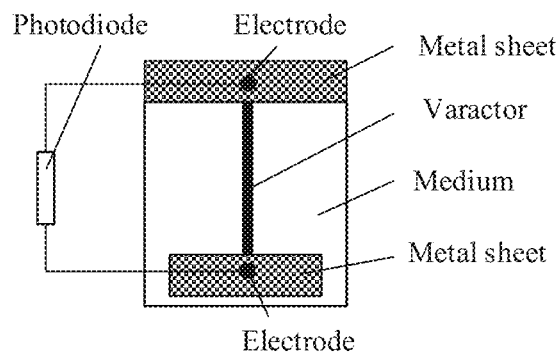

The following describes in detail a structure and a working principle of the metasurface with reference to FIG. 5 to FIG. 7, and details are not described herein.

It should be understood that phase adjustment on the microwave signal that is incident to the metasurface and change of the phase of the emitted microwave may change a focus position of the microwave, to implement power transfer (or charging) on power receiving devices at different positions. A higher precision of the offset indicates a higher precision of adjusting a corresponding position of energy focusing.

The following further describes the structure of the metasurface with reference to FIG. 5 to FIG. 7.

FIG. 5 is a schematic diagram of a structure of a metasurface 500 according to an embodiment of this application. The metasurface 500 shown in a) in FIG. 5 is an example of a specific structure of an incident surface of the metasurface. It should be understood that the incident surface of the metasurface is a surface opposite to a radiation source and a light-emitting body. As shown in the figure, the metasurface 500 may include at least one photosensitive device 510 and a metal sheet 520 connected to two electrodes of each photosensitive device. The at least one photosensitive device 510 and the metal sheet 520 connected to the at least one photosensitive device 510 may be located on a surface of a dielectric layer 530, and the surface is opposite to the radiation source and the light-emitting body.

When a microwave signal sent by the radiation source is incident to the metasurface 500, each photosensitive device 510 and a metal sheet 520 connected to the photosensitive device 510 may form an equivalent resonant circuit. b) in FIG. 5 shows an equivalent resonant circuit formed by a photosensitive device and a metal sheet connected to the photosensitive device.

As shown in the figure, a plane formed by an x-axis and a y-axis in the figure is an incident surface of the metasurface 500. When a microwave signal polarized in a y direction is incident to the metasurface along a −z direction, according to an equivalent circuit principle, each photosensitive device 510 may be equivalent to a capacitor C, and two metal sheets 520 connected to two ends of the photosensitive device 510 may be equivalent to two inductors L. Therefore, an equivalent resonant circuit formed by connecting the inductor L and the capacitor C in series may be obtained, and corresponding surface impedance may be represented as:

$$Z=iwL+1/(iwC)$$

The surface impedance obtained by using the foregoing formula is equivalent impedance of the metasurface. Because capacitance of the photosensitive device 510 may vary with a change of a light intensity, the equivalent impedance of the metasurface 500 also varies with the change of the light intensity.

It should be understood that, in the equivalent resonant circuit, the inductor and the capacitor may further vary with a change of a material, a thickness, a size, a geometric shape, and the like of the metal sheet, to change the equivalent impedance of the metasurface 500.

In this embodiment of this application, for ease of description, a photosensitive device 510 and a metal sheet 520 connected to two electrodes of each photosensitive device may be referred to as an optoelectronic unit. It can be learned from the figure that the metasurface 500 may include at least one optoelectronic unit, and in a case in which a plurality of optoelectronic units are included, the plurality of optoelectronic units may be arranged in a form of an array to form an array of optoelectronic units.

FIG. 6 and FIG. 7 respectively show embodiments of an optoelectronic unit.

In the optoelectronic unit shown in FIG. 6, a photosensitive device may be a photosensitive capacitor. Two electrodes of the photosensitive capacitor are respectively connected to two metal sheets, and each electrode may be connected to one metal sheet.

In the optoelectronic unit shown in FIG. 7, a photosensitive device may include a photodiode and a varactor. A positive electrode of the photodiode is connected to a negative electrode of the varactor, and a negative electrode of the photodiode is connected to a positive electrode of the varactor. The photodiode is connected to the varactor, so that the photodiode applies a voltage to the varactor. The voltage applied by the photodiode to the varactor varies with a change of a light intensity, so that capacitance of the varactor also varies with the change of the light intensity.

It should be understood that the photodiode and the varactor may be directly connected, or may be connected by using another component. This is not limited in embodiments of this application.

It should be further understood that the photosensitive device may be considered as a generic term for devices whose capacitance varies with a change of a light intensity. The photosensitive device may include but is not limited to the two designs shown with reference to FIG. 6 and FIG. 7. Based on a same idea, a person skilled in the art may design another photosensitive device that can enable capacitance to change in response to a change of a light intensity, so that equivalent impedance of the metasurface varies with the change of the light intensity. Such a design shall fall within the protection scope of this application.

It should be further understood that the optoelectronic units shown in FIG. 5 to FIG. 7 are in an "I" shape, but this should not constitute any limitation on this application. The optoelectronic unit may alternatively be designed in another geometric shape, such as a circle or a ring. An appearance of the optoelectronic unit may be formed by designing different geometric shapes of the metal sheet. It may be understood that when a geometric shape of the metal sheet changes, the equivalent impedance of the metasurface also varies accordingly. This is not limited in this embodiment of this application.

It should be further understood that a quantity, a size, a shape, a relative position, and the like of the optoelectronic units are not limited in this embodiment of this application. FIG. 5 is merely an example for ease of understanding, and shall not constitute a limitation on this embodiment of this application.

In some embodiments, in a wireless power transfer unit provided in this embodiment of this application, each of at least one light-emitting unit may correspond to one or more of at least one optoelectronic unit.

For example, each light-emitting unit may correspond to one optoelectronic unit. Each light-emitting unit may control a phase of an emitted microwave signal by controlling an optoelectronic unit corresponding to the light-emitting unit, to change a position of energy focusing of the microwave, and implement power transfer (or charging) on power receiving devices at different positions.

For example, when all light-emitting units emit light, a phase of an emitted wave after a microwave signal passes through the metasurface is a phase a, and a position of energy focusing is a position A. When all the light-emitting units are extinguished, no light source is provided, the phase of the emitted wave after the microwave signal passes through the metasurface is a phase b, and the position of energy focusing is a position B. When a part of light-emitting units emit light, and the other light-emitting units are extinguished, the light intensity is between the strongest and the weakest, and the light intensity may gradually increase as a quantity of extinguished light-emitting units decreases, and the phase of the emitted wave and the position of energy focusing after the microwave signal passes through the metasurface vary accordingly.

For another example, each light-emitting unit may correspond to a plurality of optoelectronic units. The plurality of optoelectronic units may be optoelectronic units concentrated in a specific region. For example, when a light-emitting unit emits light, a phase of an emitted wave after a microwave signal passes through a plurality of optoelectronic units corresponding to the light-emitting unit is a phase a; and when the light-emitting unit is extinguished, the phase of the emitted wave after the microwave signal passes through the plurality of optoelectronic units corresponding to the light-emitting unit is a phase b.

For another example, a plurality of light-emitting units may correspond to a plurality of optoelectronic units. Optoelectronic units corresponding to every two or more light-emitting units may be concentrated in a same region and staggeringly arranged. It is assumed that optoelectronic units corresponding to two light-emitting units are concentrated in a same region and staggeringly arranged. When the two light-emitting units emit light, a phase of an emitted wave after a microwave signal passes through a plurality of optoelectronic units corresponding to the two light-emitting units is a phase a. When one light-emitting unit emits light and the other light-emitting unit is extinguished, the phase of the emitted wave after the microwave signal passes through the optoelectronic units corresponding to the two light-emitting units is a phase b. When both the two light-emitting units are extinguished, the phase of the emitted wave after the microwave signal passes through the optoelectronic units corresponding to the two light-emitting units is a phase c.

It should be understood that the optoelectronic unit is a part of the metasurface structure, and the microwave signal described above passes through the optoelectronic unit, that is, the microwave signal passes through the metasurface.

In some embodiments, each of the at least one light-emitting unit corresponds to one or more of at least one radiating element. Each light-emitting unit and the corresponding one or more optoelectronic units are configured to control an offset of a phase that is generated when a microwave signal emitted by the corresponding one or more radiating elements passes through the metasurface.

Figure 8:
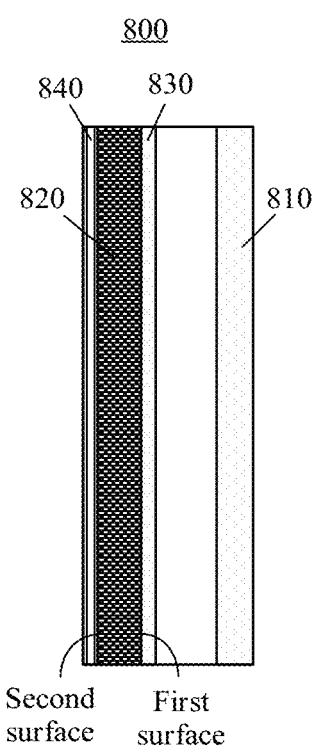
FIG. 8 and FIG. 9 are schematic diagrams of a wireless power transfer unit according to an embodiment of this application.

FIG. 8 is a schematic diagram of still another structure of a wireless power transfer unit according to an embodiment of this application. A wireless power transfer unit 800 in FIG. 8 shows a cross section of the wireless power transfer unit. As shown in FIG. 8, the wireless power transfer unit 800 may include a metasurface 810 and a dielectric layer 820. In some embodiments, there may be air or an air layer between the metasurface 810 and the dielectric layer 820.

For a structure of the metasurface 810, refer to the foregoing related description with reference to the figures. For brevity, details are not described herein again.

The dielectric layer 820 may be an insulation material, such as polytetrafluoroethylene. This is not limited in this application.

A first surface of the dielectric layer 820 is opposite to an incident surface of the metasurface, and a second surface of the dielectric layer is away from the incident surface of the metasurface.

A radiation source and a light-emitting body are disposed on the first surface of the dielectric layer 820. As described above, the radiation source may include one or more radiating elements. Each radiating element may be a microstrip antenna unit, and may include one or more microstrip patch antennas. Therefore, the radiation source may be laminated to the first surface of the dielectric layer. The light-emitting body may also include one or more light-emitting units, such as LEDs. Therefore, the light-emitting body may also be laminated to the first surface of the dielectric layer. In this way, the radiation source and the light-emitting body are similar to a radiation and light-emitting layer 830 laminated to the first surface of the dielectric layer, and the radiation and light-emitting layer may provide a microwave signal and a light source.

A feeder end of the radiation source may be, for example, disposed on the second surface of the dielectric layer 820. When the radiation source includes a plurality of radiating elements, a feeding manner of the plurality of radiating elements may be coaxial feeding.

A controller of the light-emitting body may also be disposed on the second surface of the dielectric layer.

When the feeder end of the radiation source and the controller of the light-emitting body are also laminated to the second surface of the dielectric layer, the feeder end and the controller is also similar to a feed and control layer 840 on the second surface of the dielectric layer. FIG. 8 schematically shows a form in which the feeder end and the controller are located on the second surface of the dielectric layer 820.

It should be understood that FIG. 8 is merely an example, and shows a form in which the radiation source and the light-emitting body are disposed on the first surface of the dielectric layer in a form of a radiation and light-emitting layer, and the feeder end and the controller are disposed on the second surface of the dielectric layer in a form of a feed and control layer. However, this shall not constitute any limitation on this application. For example, the feeder end and the controller may be disposed at other positions.

In addition, it should be noted that, when a plurality of wireless power transfer units are integrated into a same wireless power transfer device, feeder ends of the wireless power transfer units may feed in a coaxial manner, or may not feed in a coaxial manner. Controllers in wireless power transfer units may be independent, and separately control light intensities of the wireless power transfer units to which the controllers belong.

In some embodiments, another material may also be filled between the metasurface and the dielectric layer. For example, the wireless power transfer unit further includes a grid layer, and the grid layer may be located between the metasurface and the dielectric layer.

Figure 9:
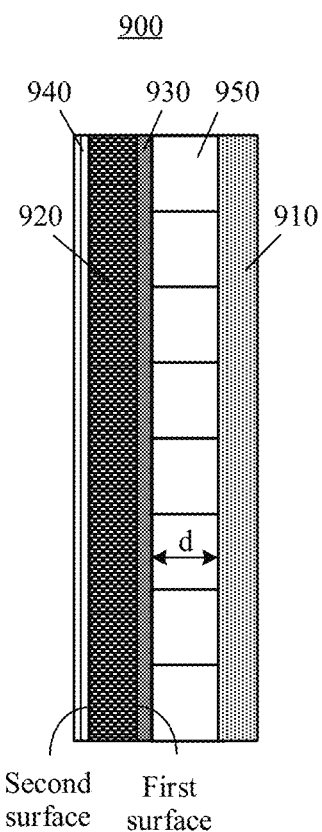

FIG. 9 is a schematic diagram of a structure of a wireless power transfer unit 900 on which a grid layer is additionally disposed. The wireless power transfer unit 900 in FIG. 9 shows a cross section of the wireless power transfer unit. As shown in FIG. 9, the wireless power transfer unit 900 may include a metasurface 910, a dielectric layer 920, and a grid layer 930. The grid layer 930 is located between the metasurface 910 and the dielectric layer 920.

For related descriptions of the metasurface 910 and the dielectric layer 920, refer to the foregoing related descriptions. For brevity, details are not described herein again.

Figure 10:
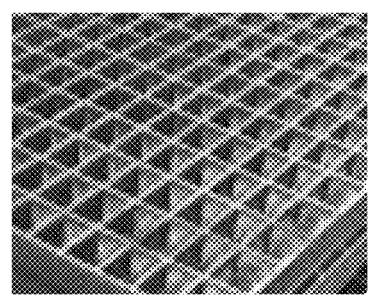
FIG. 10 and FIG. 11 are schematic diagrams of structures of a grid layer according to an embodiment of this application.
Figure 11:
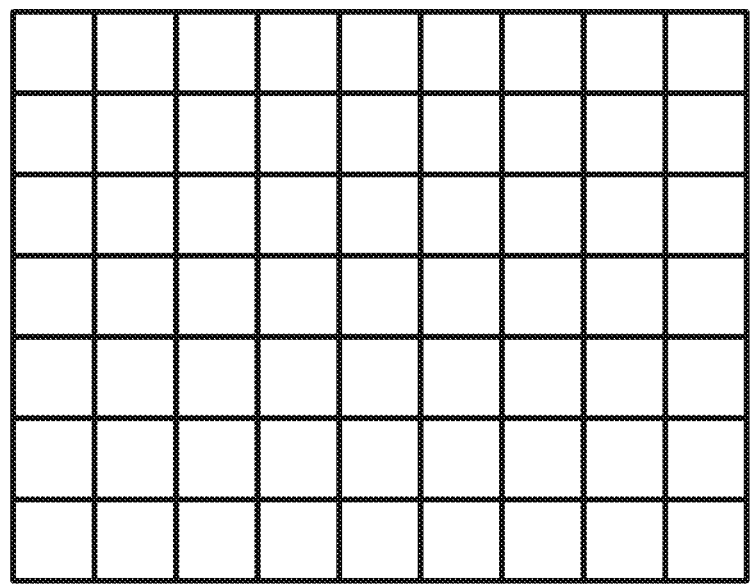

The grid layer 930 may be mainly made of a microwave transparent dielectric material, and a thickness d (as shown by d in FIG. 9) of the grid layer 930 may be controlled to be about half a wavelength of an operating frequency. For example, if the operating frequency is 5.8 GHz, the thickness d of the grid layer may be approximately 2 to 3 cm. FIG. 10 and FIG. 11 show two embodiments of the grid layer 930.

FIG. 10 shows an appearance diagram of the grid layer. As shown in the figure, the grid layer may include a plurality of grids.

It should be understood that cross sections of the plurality of grids may be, for example, in a shape such as a square, a diamond, or a hexagon that is evenly distributed. This is not limited in this application. FIG. 11 shows a grid with a square cross section.

In addition, sizes of a plurality of grids included in the grid layer may be the same, as shown in FIG. 11, or may be different. This is not limited in this application.

It should be understood that the grid layers shown in FIG. 9 to FIG. 11 are merely examples, and shall not constitute any limitation on this application. This application does not limit a quantity of grids included in the grid layer, a cross-sectional shape of the grid, or the like.

Each light-emitting unit and an optoelectronic unit and a radiating element corresponding to each light-emitting unit may be located in a same grid. In other words, one or more light-emitting units and one or more optoelectronic units and one or more radiating elements corresponding to each light-emitting unit may be disposed in each grid. For example, one light-emitting unit, one radiating element, and one optoelectronic unit may be disposed in each grid.

The grid layer 930 is additionally disposed between the metasurface 910 and the dielectric layer 920, and a light-emitting unit and a corresponding optoelectronic unit and radiating element are disposed in the grid, so that a light source provided by the light-emitting unit in the grid does not interfere with an optoelectronic unit in another grid.

Based on the foregoing design, the light-emitting body provides light sources of different light intensities, so that surface impedance of the metasurface varies with a change of the light intensity, to change an offset of a phase of the microwave signal. In this way, a same wireless power transfer unit can be emitted with a plurality of different offsets of phases, that is, multi-bit precision phase control is implemented. Because the plurality of different offsets of phases may be provided, the microwave signal emitted by the wireless power transfer unit can focus energy with higher precision. This helps improve charging efficiency.

In addition, the wireless power transfer unit may use a microstrip patch antenna as a radiation source, so that an overall design of the wireless power transfer unit is compact and approximates to a plane. Therefore, a plurality of wireless power transfer units may be integrated into a same wireless power transfer device, and the one or more plurality of wireless power transfer units may face different directions, to emit microwaves in a plurality of different directions. This can focus energy in different directions and facilitate omnidirectional coverage.

With reference to the wireless power transfer device provided above, the following describes in detail a specific procedure of wireless power transfer by using interaction between a power transfer device and a power receiving device as an example.

Figure 12:
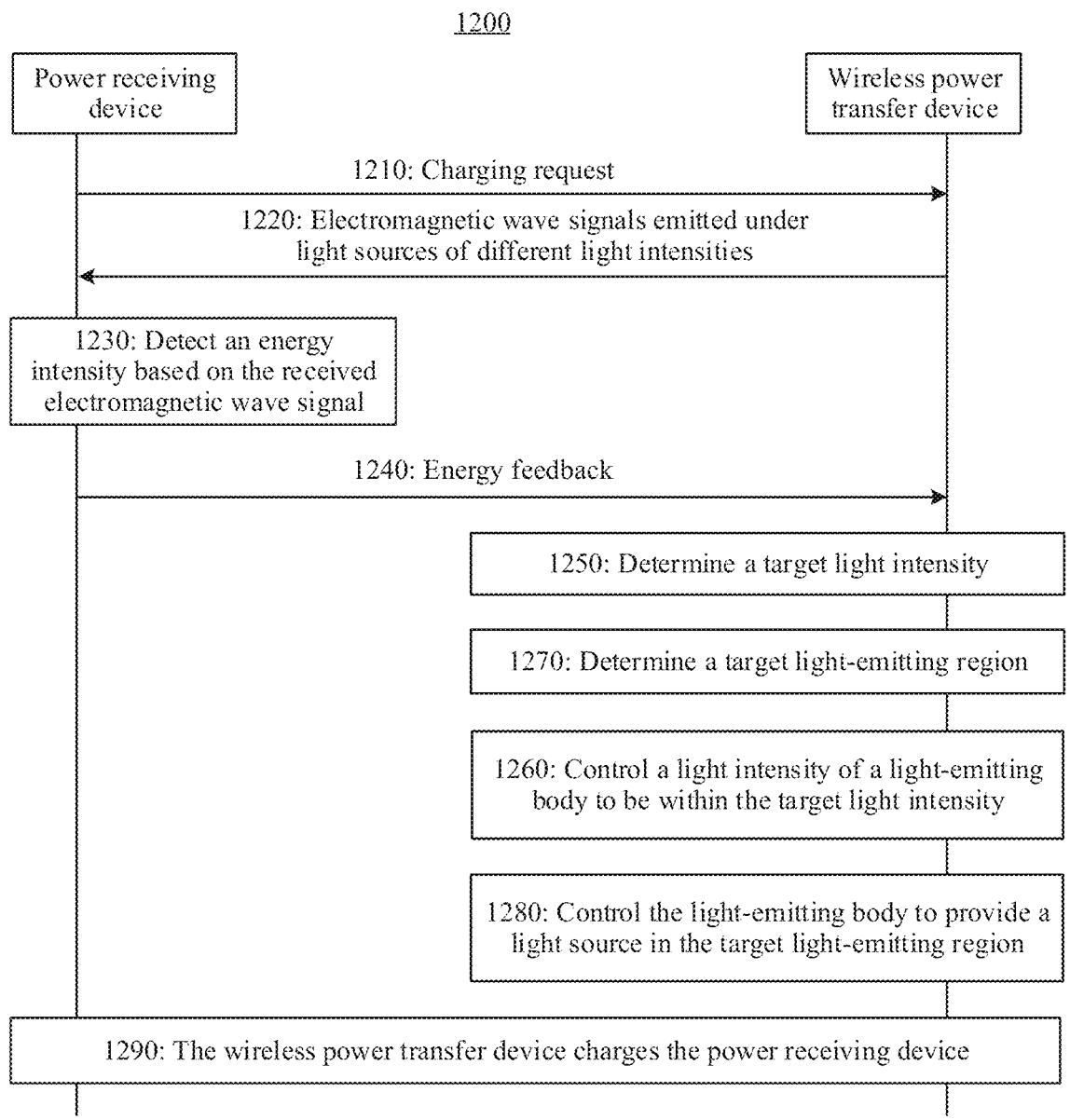
FIG. 12 is a schematic flowchart of a wireless power transfer method according to an embodiment of this application.

FIG. 12 is a schematic flowchart of a wireless power transfer method 1200 according to an embodiment of this application. As shown in FIG. 12, the method 1200 may include operation 1210 to operation 1290. The following describes the operations in the method 1200 in detail.

It should be understood that the wireless power transfer method 1200 provided in this embodiment may be applied to the foregoing wireless power transfer device, or may be applied to one or more wireless power transfer units in the wireless power transfer device. Each wireless power transfer unit may include a radiation source, a light-emitting body, a controller, and a metasurface. The radiation source is configured to emit an electromagnetic wave signal. The controller is configured to control a light intensity of the light-emitting body. The light-emitting body provides light sources of different light intensities in response to control of the controller. Equivalent impedance of the metasurface varies with a change of the light intensity of the light source, so that an offset of a phase of the electromagnetic wave signal emitted through the metasurface also varies with the change of the light intensity of the light source. For related descriptions of the wireless power transfer unit and the wireless power transfer device, refer to the foregoing related descriptions with reference to FIG. 1 to FIG. 11. For brevity, details are not described herein again.

In operation 1210, a power receiving device sends a charging request. Correspondingly, the wireless power transfer device receives the charging request.

In operation 1220, the wireless power transfer device emits electromagnetic wave signals under light sources of different light intensities. Correspondingly, in operation 1230, the power receiving device detects an energy intensity based on the received electromagnetic wave signal.

As described above, the wireless power transfer device may provide the light sources of different light intensities, and the offset of the phase of the electromagnetic wave signal may vary with the change of the light intensity. In this way, a position of energy focusing varies with the change of the light intensity. Therefore, energy of the electromagnetic wave signal received by the power receiving device at a fastened location may be variable. The power receiving device may detect the energy intensity based on the received electromagnetic wave signal.

For example, the wireless power transfer device and the power receiving device may negotiate a detection frequency in advance. The wireless power transfer device may control a change of a light intensity of a light source based on the detection frequency. The power receiving device may detect, based on the detection frequency, energy intensities of electromagnetic wave signals emitted by the wireless power transfer device under different light intensities.

The power receiving device may separately detect energy intensities based on electromagnetic wave signals received under the four combinations, for example, intensities corresponding to the four combinations is S1, S2, S3, and S4 respectively.

In operation 1240, the power receiving device sends an energy feedback. Correspondingly, the wireless power transfer device receives the energy feedback from the power receiving device.

The energy feedback may be for feeding back the energy intensities of the electromagnetic wave signals emitted under different light intensities. For example, in the foregoing example, the power receiving device may send S1, S2, S3, and S4 to the wireless power transfer device. The power receiving device may send an energy feedback once after each combination switching, or may feed back energy intensities corresponding to a plurality of combinations after the wireless power transfer device traverses all the combinations.

It should be understood that there may be embodiments in which the power receiving device sends the energy feedback. This is not limited in embodiments of this application.

In operation 1250, the wireless power transfer device determines a target light intensity based on the energy feedback of the power receiving device.

Herein, the target light intensity may be determined based on a maximum value of the energy intensity fed back by the power receiving device.

In operation 1260, the wireless power transfer device controls the light intensity of the light-emitting body to be within the target light intensity.

When the wireless power transfer device controls the light source to be within the target light intensity, the emitted electromagnetic wave signal can obtain the maximum value of the energy intensity at the position of the power receiving device. In this case, charging efficiency of the power receiving device may reach the highest. Therefore, the wireless power transfer device may control the light intensity of the light-emitting body to be within the target light intensity.

As described above, the wireless power transfer device may include a plurality of light-emitting units. The wireless power transfer device may obtain a plurality of possible combinations based on light emitting or extinguishing of each of the plurality of light-emitting units. The plurality of possible combinations may provide light sources of different light intensities. The wireless power transfer device may determine, based on the energy feedback of the power receiving device, an energy intensity corresponding to each combination, further determine a combination corresponding to a maximum value of the energy intensity, and control the light intensity to be within the target light intensity based on such a combination.

Further, the foregoing plurality of possible combinations may provide light sources of different light intensities in different regions. The wireless power transfer device may further perform operation 1270 of determining a target light-emitting region based on the energy feedback of the power receiving device; and operation 1280 of controlling the light-emitting body to provide a light source in the target light-emitting region.

It may be understood that the target light-emitting region may also be determined based on the maximum value of the energy intensity fed back by the power receiving device.

When the wireless power transfer device controls the light source to be within the target light-emitting region and the target light intensity, the emitted electromagnetic wave signal can obtain the maximum value of the energy intensity at the position of the power receiving device. In this case, charging efficiency of the power receiving device may reach the highest. Therefore, the wireless power transfer device may determine, based on the energy feedback of the power receiving device, an energy intensity corresponding to each combination, to determine the combination corresponding to the maximum value of the energy intensity.

In an example, it is assumed that a wireless power transfer unit in the wireless power transfer device emits an electromagnetic wave to the power receiving device. The wireless power transfer unit includes two light-emitting units. The two light-emitting units may provide four different combinations. For example, light emitting is denoted as "1", and extinguishing is denoted as "0". A combination provided by the two light-emitting units may be $\{1, 1\}$, $\{1, 0\}$, $\{0, 1\}$ and $\{0, 0\}$. The four combinations may provide light sources of different light intensities in different regions.

Figure 13:
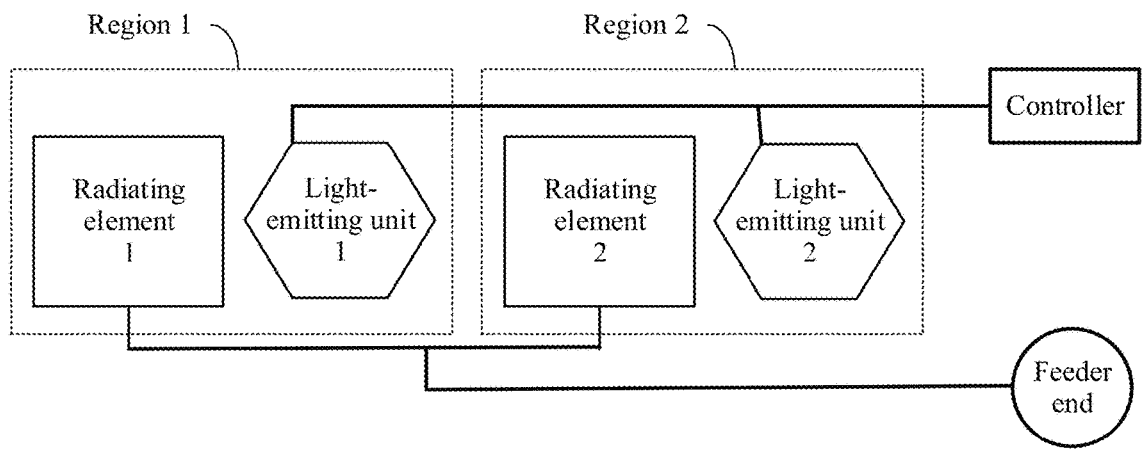
FIG. 13 is a schematic diagram of a plurality of light-emitting units according to an embodiment of this application.

A light-emitting unit shown in FIG. 13 is used as an example for description. As shown in the figure, a light-emitting unit 1 corresponds to a radiating element 1, and a light-emitting unit 2 corresponds to a radiating element 2. In the combination $\{1, 1\}$, both the two light-emitting units emit light, and both a region 1 and a region 2 may receive light sources of a same intensity. In the combination $\{1, 0\}$, the light-emitting unit 1 emits light, and the light-emitting unit 2 is extinguished. When there is no grid blocking between the two light-emitting units, a light intensity received by the region 1 may be higher than a light intensity received by the region 2. When there is grid blocking between the two light-emitting units, the region 1 may receive a light source, the region 2 may not receive a light source, and a light-emitting region is concentrated in the region 1. In the combination $\{0, 1\}$, the light-emitting unit 1 is extinguished, and the light-emitting unit 2 emits light. When there is no grid blocking between the two light-emitting units, a light intensity received by the region 2 may be higher than a light intensity received by the region 1. When there is grid blocking between the two light-emitting units, the region 2 may receive a light source, the region 1 may not receive a light source, and a light-emitting region is concentrated in the region 2. In the combination $\{0, 0\}$, both the two light-emitting units are extinguished, and neither the region 1 nor the region 2 receives a light source.

Based on the four different combinations, phases of electromagnetic wave signals that are incident to the metasurface are shifted differently. As a result, in the four different combinations, positions of energy focusing are also different.

In operation 1290, the wireless power transfer device charges the power receiving device.

The wireless power transfer device controls the light intensity to be within the target light intensity based on control of the light-emitting body. In some embodiments, after the light-emitting region of the light-emitting body is controlled to be within the target light-emitting region, the energy can be focused at the position of the power receiving device, that is, the power receiving device can start to be charged.

Based on the foregoing solution, the wireless power transfer device may track energy focusing effect of the power receiving device through high-precision phase control, and obtain the maximum value of the energy intensity at the position of the power receiving device, to charge the power receiving device. Therefore, high charging efficiency can be achieved.

It should be understood that the wireless power transfer device may charge the power receiving device by using one or more wireless power transfer units. This is not limited in this embodiment of this application. When a same power receiving device is charged by using a plurality of wireless power transfer units, the plurality of wireless power transfer devices may form more combinations of light-emitting units, to implement higher-precision phase control, and improve charging efficiency.

Figure 14:
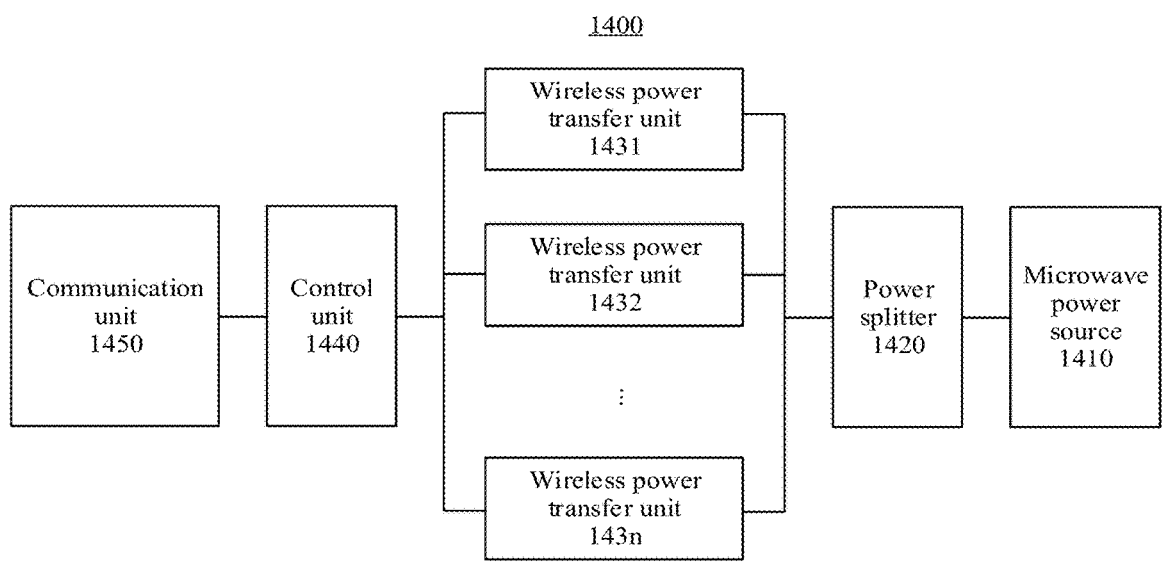
FIG. 14 is a schematic diagram of a wireless power transfer device according to an embodiment of this application.

An embodiment of this application further provides a wireless power transfer device. FIG. 14 is another schematic diagram of a wireless power transfer device according to an embodiment of this application. A wireless power transfer device 1400 shown in FIG. 14 may further include a control unit 1440 and a communication unit 1450 in addition to a microwave power source 1410, a power splitter 1420, and one or more wireless power transfer units 1431, 1432 to 143n.

The communication unit 1450 may be configured to perform operation 1210 and operation 1240 in the foregoing method 1200. The control unit 1440 may be configured to control the wireless power transfer unit to perform operation 1220 and operation 1290 in the foregoing method 1200, and may perform operation 1220 to operation 1280 in the foregoing method 1200.

It should be understood that the units shown in FIG. 14 are divided only based on different functions, and should not constitute any limitation on this embodiment of this application. The communication unit 1450 and the control unit 1440 may be but are not limited to a process that runs on a processor, a processor, an object, an executable file, a thread of execution, a program, and/or a computer. The wireless power transfer units 1431 to 143n may be but are not limited to the wireless power transfer units described with reference to FIG. 3 to FIG. 11.

A person of ordinary skill in the art may be aware that, in combination with units and algorithm operations in the examples described in embodiments disclosed in this specification, embodiments may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

In addition, functional units in the foregoing embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to a conventional technology, or the part of the technical solutions may be implemented in a form of a software product. The computer software product is stored in a storage medium, and includes several instructions for instructing a computer device (which may be a personal computer, a server, a network device, or the like) to perform all or a part of the operations of the methods in embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless power transfer unit, comprising:
a radiation source configured to emit an electromagnetic wave signal;
a light-emitting body;
a controller configured to control the light-emitting body to provide light sources of different light intensities; and
a metasurface, wherein
the light-emitting body is configured to provides the light sources of different light intensities in response to control of the controller; and
the metasurface is configured to perform phase adjustment on the electromagnetic wave signal that is incident to the metasurface, so that a phase of the electromagnetic wave signal emitted through the metasurface shifts relative to a phase before the electromagnetic wave signal is incident, wherein equivalent impedance of the metasurface varies with a change of a light intensity of the light source, so that an offset of the phase of the electromagnetic wave signal emitted through the metasurface also varies with the change of the light intensity of the light source.

2. The wireless power transfer unit according to claim 1, wherein the metasurface comprises at least one photosensitive device and a metal sheet connected to two electrodes of the at least one photosensitive device, and when the electromagnetic wave signal is incident to the metasurface, the at least one photosensitive device and the metal sheet form an equivalent resonant circuit, wherein capacitance of the at least one photosensitive device varies with the change of the light intensity so that the equivalent impedance of the metasurface also varies with the change of the light intensity.

3. The wireless power transfer unit according to claim 2, wherein the at least one photosensitive device is a photosensitive capacitor.

4. The wireless power transfer unit according to claim 2, wherein the at least one photosensitive device comprises a photodiode and a varactor, wherein a positive electrode of the photodiode is connected to a negative electrode of the varactor, and a negative electrode of the photodiode is connected to a positive electrode of the varactor, to apply a voltage to the varactor; and the voltage applied by the photodiode to the varactor varies with the change of the light intensity; so that capacitance of the varactor also varies with the change of the light intensity.

5. The wireless power transfer unit according to claim 2, wherein the light-emitting body comprises at least one light-emitting unit, and the controller comprises at least one control unit, wherein each of the at least one control unit corresponds to one or more of the at least one light-emitting unit, and each of the at least one control unit is configured to control the corresponding at least one light-emitting unit to emit light or be extinguished, to control a light-emitting region and/or a light intensity of the light-emitting body.

6. The wireless power transfer unit according to claim 5, wherein each of the at least one light-emitting unit corresponds to one or more of at least one optoelectronic unit; and each of the at least one optoelectronic unit comprises one of the at least one photosensitive device and the metal sheet connected to the two electrodes of the one of the at least one photosensitive device.

7. The wireless power transfer unit according to claim 6, wherein the radiation source comprises at least one radiating element, and each of the at least one light-emitting unit corresponds to one or more of the at least one radiating element; and each of the at least one light-emitting unit and the corresponding at least one optoelectronic unit are configured to control the offset of the phase that is generated when the electromagnetic wave signal emitted by the corresponding one or more radiating elements passes through the metasurface.

8. The wireless power transfer unit according to claim 7, wherein the at least one light-emitting unit is in a one-to-one correspondence with the at least one radiating element.

9. The wireless power transfer unit according to claim 7, wherein the at least one radiating element is a microstrip antenna unit, and the microstrip antenna unit comprises one or more microstrip patch antennas.

10. The wireless power transfer unit according to claim 7, wherein the wireless power transfer unit further comprises a grid layer, and the grid layer comprises a plurality of grids; and each of the at least one light-emitting unit and the corresponding one or more optoelectronic units and the at least one radiating elements are located in one grid of the grid layer.

11. The wireless power transfer unit according to claim 10, wherein the at least one light-emitting unit and the at least one radiating element are located on a first surface of a dielectric layer, and the first surface is opposite to an incident surface of the metasurface.

12. The wireless power transfer unit according to claim 11, wherein the controller is located on a second surface of the dielectric layer, and the second surface is away from the incident surface of the metasurface.

13. The wireless power transfer unit according to claim 12, wherein the wireless power transfer unit further comprises a feeder end that feeds the radiation source, the feeder end is located on the second surface of the dielectric layer, and the second surface is away from the incident surface of the metasurface.

14. The wireless power transfer unit according to claim 1, wherein the electromagnetic wave signal is a microwave signal.

15. A wireless power transfer device, comprising:
a microwave power source; and
one or more wireless power transfer units,
wherein each of the one or more wireless power transfer units comprises:
a radiation source configured to emit an electromagnetic wave signal,
a light-emitting body,
a controller configured to control the light-emitting body to provide light sources of different light intensities, and
a metasurface, wherein
the light-emitting body is configured to provide the light sources of different light intensities in response to control of the controller, and
the metasurface is configured to perform phase adjustment on the electromagnetic wave signal that is incident to the metasurface, so that a phase of the electromagnetic wave signal emitted through the metasurface shifts relative to a phase before the electromagnetic wave signal is incident, wherein equivalent impedance of the metasurface varies with a change of a light intensity of the light source, so that an offset of the phase of the electromagnetic wave signal emitted through the metasurface also varies with the change of the light intensity of the light source,
wherein the microwave power source is configured to provide a microwave signal to the one or more wireless power transfer units.

16. The wireless power transfer device according to claim 15, wherein the wireless power transfer device comprises a plurality of wireless power transfer units, and the wireless power transfer device further comprises a power splitter, configured to perform power distribution on the microwave signal, to output a plurality of microwave signals to one or more of the plurality of wireless power transfer units.

17. The wireless power transfer device according to claim 16, wherein emergent surfaces of the one or more of the plurality of wireless power transfer units face at least two different directions, to emit the plurality of microwave signals in the at least two different directions.

18. A wireless power transfer method, wherein the method comprises:
receiving an energy feedback from a power receiving device, wherein the energy feedback comprises at least one energy intensity fed back by the power receiving device for at least one light intensity, and each energy intensity is determined by the power receiving device based on received energy;
determining a light intensity corresponding to a maximum value of the at least one energy intensity as a target light intensity used for charging the power receiving device; and
controlling the light intensity of a light-emitting body to be within the target light intensity, wherein the target light intensity acts on a metasurface, to perform phase adjustment on an electromagnetic wave signal emitted by a radiation source.

19. The method according to claim 18, wherein the light-emitting body comprises at least one light-emitting unit, and a controller comprises at least one control unit, wherein each of the at least one control unit corresponds to one or more of the at least one light-emitting unit, and each control unit is configured to control the corresponding at least one light-emitting unit to emit light or be extinguished, to control a light-emitting region and/or the light intensity of the light-emitting body; and the energy feedback is one of the at least one energy intensity fed back for a different combination of the light intensity and the at least one light-emitting region; and the method further comprises:
determining a light-emitting region corresponding to the maximum value of the at least one energy intensity as a target light-emitting region; and
controlling the light-emitting body to provide a light source in the target light-emitting region.

20. The method according to claim 19, wherein the method further comprises:
controlling, by the controller, the at least one light-emitting unit to provide the light source in a plurality of combinations, to provide light sources of different light intensities in different light-emitting regions, wherein the plurality of combinations are obtained by traversing a light-emitting state and an extinguished state of each of the at least one light-emitting unit; and wherein the method is applied to a wireless power transfer device, the wireless power transfer device comprising one or more wireless power transfer units, and each of the one or more wireless power transfer unit comprises the radiation source, the light-emitting body, the controller, and the metasurface, wherein the radiation source is configured to emit the electromagnetic wave signal; the controller is configured to control the light intensity of the light-emitting body; the light-emitting body provides the light sources of different light intensities in response to control of the controller, wherein equivalent impedance of the metasurface varies with a change of the light intensity of the light source so that an offset of a phase of the electromagnetic wave signal emitted through the metasurface also varies with the change of the light intensity of the light source.

* * * * *

UNITED STATES PATENT AND TRADEMARK OFFICE
CERTIFICATE OF CORRECTION

PATENT NO. : 12,046,917 B2
APPLICATION NO. : 18/340355
DATED : July 23, 2024
INVENTOR(S) : Weipeng Jiang and Tao Huang It is certified that error appears in the above-identified patent and that said Letters Patent is hereby corrected as shown below:

In the Claims

In Claim 1, Column 22, Line 44, delete "configured to provides" and insert --configured to provide--.

In Claim 1, Column 22, Line 49, delete "the metasurface, so" and insert --the metasurface so--.

In Claim 1, Column 22, Line 54, delete "light source, so that" and insert --light source so that--.

In Claim 4, Column 23, Line 9, delete "the varactor, to apply" and insert --the varactor to apply--.

In Claim 4, Column 23, Line 12, delete "intensity; so that" and insert --intensity so that--.

In Claim 5, Column 23, Line 22, delete "extinguished, to control" and insert --extinguished to control--.

In Claim 5, Column 23, Line 54, delete "radiating elements are located" and insert --radiating element are located--.

In Claim 16, Column 24, Line 40, delete "power splitter," and insert --power splitter--.

In Claim 16, Column 24, Line 42, delete "signal, to output" and insert --signal to output--.

In Claim 17, Column 24, Line 47, delete "different directions, to emit" and insert --different directions to emit--.

In Claim 18, Column 24, Line 63, delete "metasurface, to perform" and insert --metasurface to perform--.

In Claim 19, Column 25, Line 5-6, delete "extinguished, to control" and insert --extinguished to control--.

Signed and Sealed this
Fifteenth Day of October, 2024

Katherine Kelly Vidal
*Director of the United States Patent and Trademark Office*

In Claim 20, Column 25, Line 21, delete "combinations, to provide" and insert --combinations to provide--.